US00RE38429E

(19) United States
(12) Reissued Patent
Eichbauer

(10) Patent Number: US RE38,429 E
(45) Date of Reissued Patent: Feb. 17, 2004

(54) STRETCH WRAP FILMS

(75) Inventor: George N. Eichbauer, Fairport, NY (US)

(73) Assignee: Tyco Plastics Services AG, Minneapolis, MN (US)

( * ) Notice: This patent is subject to a terminal disclaimer.

(21) Appl. No.: 09/999,389

(22) Filed: Oct. 31, 2001

Related U.S. Patent Documents

Reissue of:
(64) Patent No.: 5,976,682
Issued: Nov. 2, 1999
Appl. No.: 08/614,310
Filed: Mar. 12, 1996

(51) Int. Cl.[7] ..... B32B 27/32

(52) U.S. Cl. ..... 428/352; 428/213; 428/354; 428/355 RA; 428/355 EN; 428/515; 428/516; 428/520

(58) Field of Search ..... 428/213, 352, 428/354, 355 EN, 515, 516, 520, 355 RA

(56) References Cited

U.S. PATENT DOCUMENTS 3,645,992 A * 2/1972 Elston ..... 260/80.78
3,748,962 A * 7/1973 Hilkert et al. ..... 90/4

(List continued on next page.)

FOREIGN PATENT DOCUMENTS

| | | |
|---|---|---|
| EP | 0 600 425 | * 11/1993 |
| WO | WO 92/17539 | * 10/1992 |
| WO | WO 94/14855 | * 7/1994 |
| WO | WO 94/25271 | * 11/1994 |
| WO | WO 94/26816 | * 11/1994 |

OTHER PUBLICATIONS

"Advantages of Metallocene Ethylene Polymer Resin Blends Blown and in Cast Films", Research Disclosure, Aug. 1995, pp. 565–573.*
"Advantages of Metallocene Ethylene Polymer Resin Blends in Cast Film", Research Disclosure, Aug. 1995, pp. 556–557.*
"Advantages of Metallocene Ethylene Polymer Resins in Blown and Cast Stretch Films", Research Disclosure, Aug. 1995, pp. 539–545.*
Product Literature, Dow Chemical Company, "Dow Resins for Stretch Film Applications—An Overview", p. 1.5, Oct., 1994.*
Product Literature, Dow Chemical Company, "Dow Skin Resins for Cast Stretch Film Applications", p. 3.1–3.4, Oct., 1994.*
Product Literature, Dow Chemical Company, "ENGAGE Polyolefin Elastomer for Industrial Collation Packaging", KC 8852, May, 1994.*
Chowdhury, et al., "Polymers by Blueprint: Metallocene catalysts, the biggest thing to hit plastics since LLDPE, transform workhorse resins into engineering plastics," Chemical Engineering(Apr. 1993), pp. 34–39.*

(List continued on next page.)

*Primary Examiner*—D. Lawrence Tarazano
(74) *Attorney, Agent, or Firm*—Amster, Rothstein & Ebenstein

(57) ABSTRACT

The present invention provides for improved polyolefin cling/slip stretch wrap films having superior load retention, elongation, tear resistance and puncture resistance properties and for the methods of using those stretch wrap films. The stretch wrap films are preferably constructed in a multilayer fashion having an outside cling layer, an outside slip layer, at least one inside puncture resistant layer comprising a metallocene-catalyzed polyethylene resin, and at least one inside transverse direction tear resistant layer.

96 Claims, 1 Drawing Sheet

U.S. PATENT DOCUMENTS 3,986,611 A * 10/1976 Dreher ..... 206/386
4,011,382 A * 3/1977 Levine et al. ..... 526/96
4,050,221 A * 9/1977 Lancaster, III et al. ..... 53/211
4,076,698 A * 2/1978 Anderson et al. ..... 526/348.6
4,163,831 A * 8/1979 Gessell ..... 526/153
4,205,021 A * 5/1980 Morita et al. ..... 525/240
4,302,565 A * 11/1981 Goeke et al. ..... 526/88
4,302,566 A * 11/1981 Karol et al. ..... 526/125
4,359,561 A * 11/1982 Fraser et al. ..... 526/88
4,399,173 A * 8/1983 Anthony et al. ..... 428/35
4,399,180 A * 8/1983 Briggs et al. ..... 428/212
4,418,114 A * 11/1983 Briggs et al. ..... 428/218
4,461,873 A * 7/1984 Bailey et al. ..... 525/240
4,511,609 A * 4/1985 Craver et al. ..... 428/35
4,518,654 A * 5/1985 Eichbauer et al. ..... 242/159
4,522,987 A * 6/1985 Hogan et al. ..... 526/106
4,565,720 A * 1/1986 Yaeo et al. ..... 428/35
4,574,104 A * 3/1986 Aishima et al. ..... 428/220
4,588,650 A * 5/1986 Mientus et al. ..... 428/516
4,808,561 A * 2/1989 Welborn, Jr. ..... 502/104
4,833,017 A * 5/1989 Benoit ..... 428/323
4,871,523 A * 10/1989 Datta et al. ..... 423/265
4,871,705 A * 10/1989 Hoel ..... 502/117
4,925,821 A * 5/1990 Chang ..... 502/107
4,925,825 A * 5/1990 Tachi et al. ..... 502/309
4,937,301 A * 6/1990 Chang ..... 526/128
5,001,205 A * 3/1991 Hoel ..... 526/128
5,006,500 A * 4/1991 Chang ..... 502/107
5,017,655 A * 5/1991 Kase et al. ..... 525/127
5,019,315 A * 5/1991 Wilson ..... 264/171
5,026,798 A * 6/1991 Canich ..... 526/127
5,032,652 A * 7/1991 Chang ..... 526/129
5,049,423 A * 9/1991 German, Jr. ..... 428/35.2
5,079,205 A * 1/1992 Canich ..... 502/117
5,084,534 A * 1/1992 Welborn, Jr. et al. ..... 526/160
5,085,927 A * 2/1992 Dohrer ..... 428/220
5,124,418 A * 6/1992 Welborn, Jr. ..... 526/114
5,173,343 A * 12/1992 Arvedson et al. ..... 428/34.9
5,183,867 A * 2/1993 Welborn, Jr. ..... 526/114
5,206,075 A * 4/1993 Hodgson, Jr. ..... 428/216
5,248,547 A * 9/1993 Wilson ..... 428/218
5,272,016 A * 12/1993 Ralph ..... 428/516
5,273,809 A * 12/1993 Simmons ..... 428/212
5,278,272 A * 1/1994 Lai et al. ..... 526/348.5
5,279,872 A * 1/1994 Ralph ..... 428/34.9
5,283,128 A * 2/1994 Wilhoit ..... 428/516
5,296,580 A * 3/1994 Matsunaga et al. ..... 528/502
5,334,428 A * 8/1994 Dobreski et al. ..... 156/244.11
5,358,792 A * 10/1994 Mehta et al. ..... 428/516
5,374,459 A * 12/1994 Mumpower et al. ..... 428/36.7
5,376,439 A * 12/1994 Hodgson et al. ..... 428/220
5,380,810 A * 1/1995 Lai et al. ..... 526/352
5,382,631 A * 1/1995 Stehling et al. ..... 525/240
5,395,471 A * 3/1995 Obijeski et al. ..... 156/244.11
5,397,613 A * 3/1995 Georgelos ..... 428/36.7
5,397,640 A * 3/1995 Georgelos et al. ..... 428/349
5,399,426 A * 3/1995 Koch et al. ..... 428/335
5,407,732 A * 4/1995 Dokurno ..... 428/213
5,419,795 A * 5/1995 Wood et al. ..... 156/184
5,420,220 A * 5/1995 Cheruvu et al. ..... 526/348.1
5,431,284 A * 7/1995 Wilson ..... 206/597
5,451,450 A * 9/1995 Erderly et al. ..... 428/220
5,451,468 A * 9/1995 Seiler et al. ..... 428/515
5,460,861 A * 10/1995 Vicik et al. ..... 428/34.9
5,462,807 A * 10/1995 Halle et al. ..... 428/500
5,482,770 A * 1/1996 Bekele ..... 428/339
5,482,771 A * 1/1996 Shah ..... 428/349
5,491,019 A * 2/1996 Kuo ..... 428/213
5,523,136 A * 6/1996 Fischer et al. ..... 428/35.2
5,530,065 A * 6/1996 Farley et al. ..... 525/240
5,543,223 A * 8/1996 Shah ..... 428/349
5,558,930 A * 9/1996 DiPoto ..... 428/216
5,595,050 A * 1/1997 Koch et al. ..... 53/441
5,617,707 A * 4/1997 Simmons ..... 53/441
5,749,202 A * 5/1998 Eichbauer ..... 53/399
5,752,362 A * 5/1998 Eichbauer ..... 53/399
5,814,399 A * 9/1998 Eichbauer ..... 428/213
5,902,684 A * 5/1999 Bullard et al. ..... 428/515
5,907,942 A * 6/1999 Eichbauer ..... 53/441
5,907,943 A * 6/1999 Eichbauer ..... 53/441
5,922,441 A * 7/1999 Eichbauer ..... 427/376.2
5,998,017 A * 12/1999 Eichbauer ..... 428/343
6,083,611 A * 7/2000 Eichbauer et al. ..... 428/213
6,093,480 A * 7/2000 Eichbauer ..... 428/213

OTHER PUBLICATIONS

Product Literature, To Give Your Customers' Used Stretch Film A New Lease On Life, Turn The Page, Mobil, 4 pgs. 1993.*

Schut, "Competition for Metallocenes Could Turn Ugly," Plastics World(Jan. 1995), pp. 33–36.*

Leaversuch, R., "LDPE, mPE vie in Flexible Film Market", Modern PlasticsSep. 1994, 23,25.*

* cited by examiner

STRETCH WRAP FILMS

Matter enclosed in heavy brackets [ ] appears in the original patent but forms no part of this reissue specification; matter printed in italics indicates the additions made by reissue.

FIELD OF THE INVENTION

The present invention is directed to stretch wrap films and methods for their use. In particular, the present invention is directed to stretch wrap films having a cling surface and an opposite slip surface and having superior puncture resistance, high elongation to break, high force to stretch the film, and overall strength.

BACKGROUND OF THE INVENTION

The use of thermoplastic stretch wrap films for the overwrap packaging of goods, and in particular, the unitizing of palleted loads is a commercially significant application of polymer film, including generically, polyethylene. Overwrapping a plurality of articles to provide a unitized load can be achieved by a variety of techniques. In one procedure, the load to be wrapped is positioned on a platform, or turntable, which is made to rotate and in so doing, to take up stretch wrap film supplied from a continuous roll. Braking tension is applied to the film roll so that the film is continuously subjected to a stretching, or tensioning, force as it wraps around the rotating load in overlapping layers. Generally, the stretch wrap film is supplied from a vertically arranged roll positioned adjacent to the rotating pallet load. Rotational speeds of from about 5 to 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods.

Another wrapping method finding acceptance in industry today is that of hand wrapping. In this method, the film is again arranged on a roll, however, it is hand held by the operator who walks around the goods to be wrapped, applying the film to the goods. The roll of film so used may be installed on a hand-held wrapping tool for ease of use by the operator.

The stretch wrap film is thus applied in its stretched state and is held in place by the cling forces of the film onto its opposite surface. Various film resins contain additives to increase this cling property, although specific film resins have been developed that possess inherently good cling characteristics.

Certain applications of stretch wrap films require that the film have superior cling characteristics in its applied strectched state and have superior slip characteristics when loaded beside other wrapped articles. These types of films are referred to as "cling/slip" films and are commonly used in the shipping of carpet and fabric rolls.

Some of the properties desired of a good stretch cling/slip film are as follows: good cling or cohesion properties of inside/outside surfaces, slip between outside layers, high puncture resistance, good machine direction tear resistance, high tear resistance in the transverse direction, good transparency, good opacity, low stress relaxation with time, high resistance to transverse tear when under machine direction tension, producible in thin gauges, good tensile toughness, high machine direction ultimate tensile strength, high machine direction ultimate elongation, and low modulus elasticity.

Physical properties which are particularly significant for the successful use of thermoplastic films in stretch wrap applications include their puncture resistance, their elongation characteristics, their toughness and their resistance to tearing while under tension. In general, tensile toughness is measured as an area under a stress-strain curve developed for a thermoplastic film and it may be considered as the tensile energy absorbed, expressed in units of ft. lbs./cu.in. to elongate a film to break under tensile load. In turn, this toughness characteristic is a function of the capacity of such films to elongate. The process of stretching the film decreases that capacity. Accordingly, the stretch wrap process will decrease the toughness of the film while it is in its stretched condition as an overwrap as compared to its unstretched form. Generally this loss of toughness is proportional to the amount of stretch imparted to the film as it is overwrapping a load of goods.

Currently, different grades of stretch wrap films are commonly marketed for different end uses according to overall film properties. For example, certain stretch wrap films having superior properties for load retention are characterized by requiring a higher force to stretch the film. However, such load retention films generally have poor puncture characteristics at such stretch conditions. On the other hand, certain stretch wrap films having superior puncture resistance properties have low load retention properties, thus limiting their use.

A need exists to develop superior stretch wrap films characterized by having superior load retention characteristics, puncture resistance, inside to outside surface cling, and slip properties between outside layers and against other surfaces. Such films could be used in a wider variety of end applications and thus not unduly limit users of stretch wrap films to selectively choosing a film based on its properties prior to initiating a stretch wrap application.

SUMMARY OF THE INVENTION

The present invention provides for a superior stretch wrap film having improved cling, slip, load retention, tear, elongation, and puncture resistance properties. The stretch wrap films are designed for use in cling/slip film applications. The stretch wrap film is advantageously employed in wrapping articles while under tension whereby the film itself is stretched generally between 20 and 400% of its original length.

The stretch wrap film of the present invention is a multilayer film construction. In such a construction there is provided an outside cling layer and an opposing outside slip layer. Between these two outside film layers there is positioned a puncture resistant, inner polymeric film layer comprising at least 40 weight percent of a polyethylene copolymer having a polydispersity of from 1 to 4, a melt index of from 0.5 to 10 g/10 min., and a melt flow ratio ($I_{20}/I_2$) of from 12 to 22. The polyethylene copolymer used to construct the puncture resistant film layer is preferably produced utilizing metallocene catalyst polymerization techniques. The multilayer film construction further contains a transverse direction tear resistant layer located between the two outside film layers, wherein the resin comprising the tear resistant layer forms a film having a higher transverse direction tear resistance than films constructed with the resins that comprise the puncture resistant film layer and the outside cling layers.

The multilayer film can be constructed with additional film layers. For instance, additional puncture resistant film layers can be incorporated into the film between the outer film layers, where such additional layers are constructed with the same or different metallocene-catalyzed polyethylene resins as the first puncture resistant film layer. A film can also be constructed with additional transverse direction tear resistant layers between the outer film layers, again using the same or different resins for each distinct multiple layer.

The multilayer films of the present invention have been found to display unexpectedly superior film properties compared to other film constructions, surprisingly without undue degradation of other important film properties. The incorporation of an internal puncture resistant layer and an internal transverse direction tear resistant layer, using the resins for those layers as set forth herein, has produced an overall film that has superior elongation characteristics. Also, the films of the present invention display enhanced transverse direction tear properties without a concomitant loss of machine direction tear properties.

DETAILED DESCRIPTION OF THE INVENTION

Figure 1:
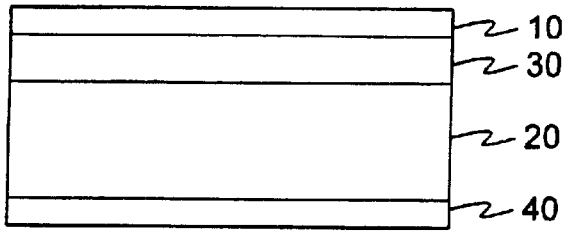
FIG. 1 shows a four layer film constructed in accordance with the present invention.

The present invention sets forth multilayer stretch wrap thermoplastic films that are characterized by having a relatively high inside/outside layer cling force, a relatively high puncture resistance, a relatively high machine direction tensile strength, a measurable outside layer slip property, and relatively high tear resistance in both the transverse and machine directions. These films are advantageously utilized in "cling/slip" applications. These multilayer stretch wrap films can be prepared as cast films by conventional coextrusion techniques.

The cling surface layer of the multilayer stretch wrap films of the present invention can be constructed with various resin materials. One such resin is comprised of a first ethylene monomer and a second monomer that comprises an acrylate, where the acrylate content is from about 15–40% by weight of the polymer film, such as ethylene-acrylate (EA) polymer films, such as those shown in U.S. Pat. No. 5,049,423, which is incorporated herein in its entirety by reference. These EA polymers generally have an acrylate content between about 2–40%, preferably between about 10–35%, more preferably 20–30%, by weight based on the weight of the EA polymer. The acrylate useful in these polymers are those generally known in the art, preferably methyl, ethyl, and n-butyl acrylate. EA polymers found to be useful have a methyl acrylate content of from about 24–28% wt. The EA polymers that are useful generally have a MI of from about 3.0 to about 7.0, and advantageously a MI of from about 4.0 to about 6.0 g/10 min. Commercially available EA polymers include the Exxon XC-101 and XC-102 products.

Another resin useful as the cling layer for the multilayer stretch wrap films of the present invention include ethyl vinyl acetate (EVA) copolymers having a density of from about 0.928 to about 0.935 g/cm$^3$, a MI of from about 1 to about 5 g/10 min., and a vinyl acetate content of from about 5 to about 15 weight percent.

The outside cling layer of the stretch wrap films of the present invention can also be constructed of olefin polymer resins. Suitable polyethylene resins are those ethylenic copolymers that comprise a major proportion by weight of ethylene copolymerized with a minor proportion by weight of an alpha olefin monomer containing 3 to 12, preferably 4 to 10, and more preferably 4–8, carbon atoms. Preferred ethylenic copolymers are those commonly referred to as linear low density polyethylenes (LLDPE) and very low density polyethylenes (VLDPE). Preferably the ethylenic copolymers employed are those having from about 1 to about 20, preferably from about 1 to about 10 weight percent of said higher alpha olefin monomer copolymerized therein. In addition, it is also preferred that the alpha olefin monomer employed in the ethylenic copolymer is selected from the group consisting of butene-1, 3-methyl-butene-1, 3-methyl-pentene-1, hexene-1, 4-methyl-pentene-1, 3-methyl-hexene-1, octene-1 and decene-1. Particularly preferred are the hexene-1 alpha olefins. The LLDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein. Common LLDPE resins that can be used to form such an outside cling layer include those having a relatively high weight percentage of n-hexane extractibles, as measured by the n-hexane extractibles method of 21 C.F.R. 177.1520. Generally, the LLDPE used in the outside cling layer herein will contain from about 2 to about 10, preferably from about 2 to about 8, more preferably from about 2.5 to about 5, weight percent of n-hexane extractibles. The LLDPE resins that can be used in the outside cling layer herein have a density ranging from about 0.890 to about 0.940 g/cm$^3$, more commonly from about 0.90 to about 0.93 g/cm$^3$, and a melt index of from about 1 to about 10 g/10 min. Particularly preferred are those LLDPE resins possessing densities within the range from about 0.917 to 0.920 gm/c.c and a melt index within the range from about 2.0 to 5.0. Examples of such LLDPE resins include those set forth in U.S. Pat. No. 5,273,809, which is hereby incorporated by reference in its entirety.

The VLDPE resins that can be used in the outside cling layer herein have a density ranging from about 0.880 to about 0.912 g/cm$^3$, more commonly from about 0.89 to about 0.91 g/cm$^3$, and a melt index of from about 1.0 to about 5.0 g/10 min.

The resins that can be used in the outside cling layer herein can also contain known and conventional cling additives to augment the cling property that, at least in the case of the particularity preferred resins, is inherently exhibited. Examples of useful cling additives include polyisobutylenes having a number average molecular weight in the range from aout 1,000–3,000, preferably about 1,200–1,800, as measured by vapor phase osmometry, amorphous atactic polypropylenes, e.g., those having an average molecular weight of about 2000, and polyterpenes and ethylene-vinyl acetate copolymers containing from about 5–15 weight percent copolymerized vinyl acetate. The optional cling additive can be present in the outside cling layers in a concentration of from about 0.5 to about 10 weight percent of the resin. Of course, other conventional film additives such as antioxidants, UV stabilizers, pigments, dyes, etc., can be present in the usual amounts.

The slip film layer of the multilayer stretch wrap films of the present invention can be constructed of various resin materials suitable for such purposes. Examples of such resins include polyolefin resins and copolymers of polyolefins such as polyethylene, polypropylene, and combinations thereof. Suitable polymer resins additionally include copolymers of polyethylene with minor amounts of other $C_{4-10}$ olefins, particularly $C_{6-8}$ polyolefins. Preferred polymers include polypropylenes, preferably isotactic, having a density of from about 0.89 to about 0.91 g/cm$^3$, and an MI value of from about 5 to about 25 g/10 min. Preferred polyethylenes include high pressure low density polyethylene (HPLDPE) resins having a density of from about 0.92 to about 0.94 g/cm$^3$, and an MI value of from about 1.0 to about 4.0 g/10 min, and linear low density polyethylene (LLDPE) resins having a density of from about 0.925 to about 0.945 g/cm$^3$, and an MI value of from about 2.0 to about 5.0 g/10 min.

The slip film layer can include any of several anticling, slip or antiblock additives to improve the slip characteristics of the film layer. Such additives include silicas, talcs, diatomaceous earth, silicates, lubricants, etc. These additives are generally blended with the resin material in an amount of from about 100–20,000 ppm.

The multilayer stretch warp films of the present invention can be constructed to contain at least one inner film layer, located between the two outside film layers, of a thermoplastic material possessing superior puncture resistance, and preferably good machine direction tear resistance. This puncture resistant film layer is made from a partially crystalline polyethylene resin, hereinafter "puncture resistant resin", that is a polymer prepared with ethylene and at least one alpha olefin monomer, e.g. a copolymer or terpolymer. The alpha olefin monomer generally has from 3 to about 12 carbon atoms, preferably from 4 to 10 carbon atoms, and more preferably from 6 to 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene. The puncture resistant resin generally has the characteristics associated with an LLDPE material, however it has improved properties as explained more fully below. The puncture resistant resin defined herein will have a density from 0.88 to 0.94 g/cm$^3$, preferably from 0.88 to 0.93 g/cm$^3$, and more preferably from 0.88 to 0.925 g/cm$^3$.

The weight average molecular weight of the puncture resistant resin can generally range from about 20,000 to about 500,000, preferably from about 50,000 to about 200,000. The molecular weight is determined by commonly used techniques such as size exclusion chromatography or gel permeation chromatography. The puncture resistant resin should have a molecular weight distribution, or polydispersity, ($M_w/M_n$, "MWD") within the range of about 1 to about 4, preferably about 1.5 to about 4, more preferably about 2 to 4, and even more preferably from 2 to 3. The ratio of the third moment to the second moment, $M_z/M_w$, is generally below 2.3, preferably below 2.0, and more typically in the range of from about 1.6–1.95. The melt flow ratio (MFR) of these resins, defined as $I_{20}/I_2$ and as determined in accordance to ASTM D-1238, is generally from about 12 to about 22, preferably from about 14 to about 20, and more preferably from about 16 to about 18. The melt index (MI), defined as the $I_2$ value, should be in the range of from about 0.5 to about 10, preferably from about 1 to about 5 g/10 min.

Useful puncture resistant resin materials are available from, among others, Dow Chemical Company and Exxon Chemical Company who are producers of single site or constrained geometry catalyzed polyethylenes. These resins are commercially available as the AFFINITY and EXXACT polyethylenes (see Plastics World, p.33–36, January 1995), and also as the ENHANCED POLYETHYLENE and EXCEED line of resins. The manufacture of such polyethylenes, generally by way of employing a metallocene catalyst system, is set forth in, among others, U.S. Pat. Nos. 5,382,631, 5,380,810, 5,358,792, 5,206,075, 5, 183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is hereby incorporated herein by reference in its entirety. These catalyst systems and their use to prepare such puncture resistant resin materials are also set forth in EP 0 600 425 A1 and PCT applications WO 94/25271 and 94/26816. The polyethylene resins thus produced generally have a crystalline content in excess of at least 10 weight percent, generally in excess of at least 15weight percent.

The above patents and publications generally report that these catalysts contain one or more cyclopentadienyl moieties in combination with a transition metal. The metallocene catalyst may be represented by the general formula $C_aMA_aB_b$ wherein C is a substituted or unsubstituted cyclopentadienyl ring; M is a Group 3–10 metal or Lanthanide series element, generally a Group IVB, VB, or VIB metal; A and B are independently halogen, hydrocarbyl group, or hydrocarboxyl groups having 1–20 carbon atoms; a=0–3, b=0–3, and c=1–3. The reactions can take place in either gas phase, high pressure, slurry, or solution polymerization schemes.

The puncture resistant film layer of the present multilayer films is preferably constructed entirely with the puncture resistant resin, preferably produced through the metallocene catalyst technology. The puncture resistant film layer can also be constructed with a blend of the puncture resistant resin with a second resin material. The second resin material is preferably a LLDPE resin having a density of between about 0.89 and 0.94 g/cm$^3$, a LDPE resin having a density of between about 0.9 and 0.935 g/cm$^3$, or VLDPE resin having a density of between about 0.88 and 0.91 g/cm$^3$. The comonomer for the second resin material preferably has from 4–10, more preferably 6–8 carbon atoms. If a second resin material is to be incorporated with the puncture resistant resin, it is preferred to maintain the level of the puncture resistant resin to at least 40 weight percent, preferably at least 50 weight percent, and more preferably at least 60 weight percent, of the blended resin film. The resultant blended polymer resin maintains the desired properties of the puncture resistant resin material and may be more economical for certain applications.

The multilayer stretch wrap films of the present invention can contain at least one inner film layer, located between the two outside film layers, of a thermoplastic material possessing superior transverse direction tear properties. The resin utilized in this film layer also contributes to the multilayer films of the present invention the ability to strain harden during the use of the film. The strain hardening characteristic can be generally described as the requirement to exert a higher force to continually stretch the film beyond its already stretched state. This film layer increases the machine direction tensile strength of the overall film.

Resins useful for preparing this transverse direction tear film layer include high pressure low density polyethylenes (HPLDPE) having a density within the range of from about 0.90 to about 0.935 g/cm$^3$ with a melt index of from about 0.5 to about 10. A preferred HPLDPE resin is one having a density in the range of from about 0.915 to about 0.925 g/cm$^3$, a melt index of from about 1 to about 10, preferably having a melt index from about 1 to about 5, and more preferably having a melt index of from 1 to 2.5 g/10 min. Other types of resins useful for preparing this film layer include polypropylene, generally isotactic polypropylene in a density range of 0.89–0.91 g/cm$^3$ and a melt flow rate of from 5–25 g/10 min. as determined by ASTM D1238, ethylene-propylene copolymers having a density of between about 0.89 and 0.91 g/cm$^3$ and a melt flow rate of from 2–10 g/10 min., and linear low density polyethylene resins having a density of between about 0.89 and 0.935 g/cm$^3$ and having a melt index of below 2.0 g/10 min. The resin used for this tear resistant film layer preferably has a higher transverse direction tear resistance than the resins employed for the other film layers, e.g. the outside cling layers, and the puncture resistant film layer. That is, if separate films were prepared from each resin used for the individual film layers of the multilayer stretch films of the present invention, the resins used for the transverse direction tear resistant layer would produce a film having a higher transverse direction tear level than the films prepared from the resins used to prepare the outside layers and the puncture resistant layer.

The stretch wrap films of the present invention can be constructed to contain a plurality of layers of the tear resistant film and the puncture resistant film in various combinations. Generally, the stretch wrap film will be of an A\B\C\D construction as shown in FIG. 1 wherein the film layer (10) is the outside cling layer, layer A, film layer (40) is the outside slip layer, layer D, film layer (20) is the puncture resistant film layer, layer B, and film layer (30) is the tear resistant film layer, layer C. The outside cling layer (10) can be switched with the outside slip layer (40) with respect to the other film layers (20, 30).

Figure 2:
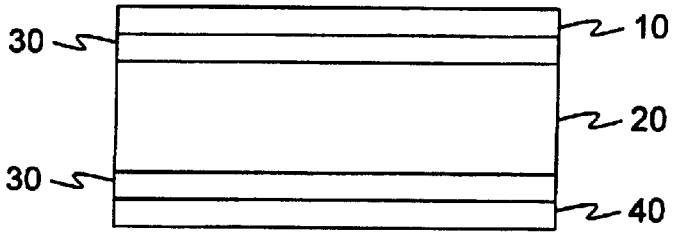
FIG. 2 shows a five layer film constructed in accordance with the present invention.
Figure 3:
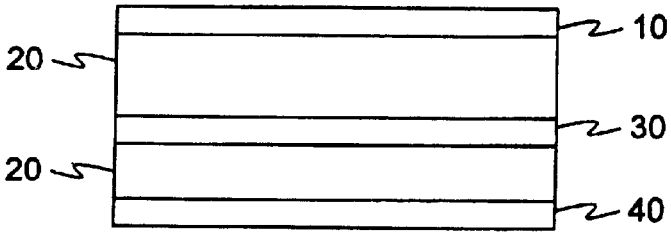
FIG. 3 shows a five layer film constructed in accordance with the present invention.

In a preferred embodiment, the stretch wrap film is of an A\B\C\B\D or A\C\B\C\D construction such as those shown in FIGS. 2 and 3 where the film layers (10), (20), (30), and (40) are the same as previously described with respect to FIG. 1. Alternatively, film constructions such as A\B\B\C\D and A\B\C\C\D can also be prepared, and in addition films can be prepared having more than two layers of either the puncture resistant layers, layer B, and/or the tear resistant layer, layer C. In such constructions, the distinct B and C layers can be constructed with the same resins or with different resins to tailor the properties of the multilayer film.

The overall stretch wrap film properties are such that it has a cling force of at least about 140, preferably at least about 180, more preferably at least about 300, and in some cases as high as at least about 400 or at least about 500, grams/inch as determined by ASTM D5458-94. Generally, the cling force of the film will be in the range of from about 140–600 grams/inch.

The overall stretch wrap films have relatively high puncture resistance, as measured by the F-50 dart drop test procedure (ASTM D1709). It is the experience of those skilled in the art that the F-50 dart drop test is well correlated to the end use puncture resistance of stretch wrap films. The F-50 dart drop value of the films is at least about 150 g/mil, preferably at least about 250 g/mil, and more preferably from at least about 350 g/mil. The multilayer films generally have an F-50 dart drop value below about 900 g/mil.

The stretch wrap films of the present invention are preferably constructed so that the overall transverse direction tear, as determined by ASTM D1922, is at least about 500 g/mil, preferably at least about 600 g/mil, more preferably at least about 700 g/mil. The machine direction tear of the film is generally at least about 175 g/mil, preferably at least about 225 g/mil, and more preferably at least about 275 g/mil.

A parameter used to analyze the performance of stretch wrap films is the force required to stretch the film to a desired percentage of its original length. This force is indicative of the load retention characteristics of the film and is determined in accordance with ASTM D882. The films of the present invention generally have a force to stretch the film to 200% of at least about 1600 psi, preferably at least about 1800 psi, more preferably at least about 2000 psi, and in some cases at least about 2200 psi. The films of the present invention generally have a force to stretch the film to 250% of at least about 1800 psi, preferably at least about 2000 psi, more preferably at least about 2250 psi, and in some cases at least about 2500 psi.

The multilayer films of the present invention exhibit improved outside/outside film slip characteristics. The slip properties of the films are reported as coefficient of friction (COF) values in accordance with ASTM-D1894. The films generally have a kinetic COF value of below about 1.0, preferably below about 0.8, and more preferably below about 0.6.

The film configurations are constructed according to conventional practices. Generally, the preferred processing technique is to coextrude and cast the films in a simultaneous fashion, however in some cases it may be appropriate to first coextrude at least two film layers and thereafter extrusion coat the remaining film layers. It is preferred to employ known and conventional techniques of coextrusion to assemble the composite structures of the films of this invention. Reference may be made to U.S. Pat. No. 3,748,962, the contents of which are incorporated by reference herein, for details of a coextrusion procedure which can be employed in the fabrication of a multilayer film in accordance with this invention. Generally, the resin materials are heated to their molten state and their viscosities are coordinated to prepare multilayer films in a uniform manner. The molten materials are conveyed to a coextrusion adapter that combines the molten materials to form a multilayer coextruded structure. The layered polymeric material is transferred through an extrusion die opened to a predetermined gap commonly in the range of between about 0.05 in. (0.13 cm) and 0.012 in. (0.03 cm). The material is then drawn down to the intended gauge thickness by means of a primary chill or casting roll maintained at about 60–130° F. (15–55° C.). Typical draw down ratios range from about 5:1 to about 40:1.

The overall thickness of the stretch wrap film can vary widely according to end use specifications, but is generally in the range of the typical thicknesses for stretch wrap films. Conventional for such films is a thickness of from about 0.4 to about 3 mils, and is application specific. In the present invention wherein the multilayer films are of a coextruded nature, it is preferred that the outer cling layer comprises from about 5 to about 25, preferably from about 5 to about 20, and more preferably from about 5 to about 15, weight percent of the total film weight. The outer slip layer comprises from about 5 to about 25, preferably from about 5 to about 20, and more preferably from about 10 to about 20, weight percent of the total film weight. The inner film layer(s) of the transverse direction tear resistant film material comprise from about 2 to about 40, preferably from about 5 to about 40, more preferably from about 5 to about 30, and most preferably from about 5 to about 25, weight percent of the total film weight. The inner film layer(s) of the puncture resistant film material will account for the balance of the film, and generally will comprise from about 20 to about 85, preferably from about 40 to about 80, and more preferably from about 60 to about 80, weight percent of the film.

It has been found that the benefits provided from the transverse direction tear resistant film material are substantially obtained with up to about 15 weight percent, preferably up to about 10 weight percent, of the overall film. The incorporation of this film layer at these levels, in conjunction with the incorporation of the puncture resistant film layer, has led to an unexpected improvement in the machine direction tensile elongation, and machine direction stretch properties of the overall films. These properties have been found to be appreciably enhanced surprisingly without a significant loss of other important film properties, and as a result the overall film stretch wrap performance has been enhanced.

Either or both of the outside surfaces of the film can be treated by such known and conventional post-forming operations as corona discharge, chemical treatment, flame treatment, etc., to modify the printability or ink receptivity of the surface(s) or to impart other desirable characteristics thereto.

The stretch wrap film of this invention can, if desired, be provided in the non-stretched, i.e., unoriented, or at most only modestly stretched, state prior to use. The films of the present invention are capable of being stretched from at least about 10, more commonly at least about 100 or at least about 200, and in some cases at least about 300, linear percent during the overwrapping operation.

The pallet unitizing techniques described in U.S. Pat. Nos. 3,986,611 and 4,050,221 are contemplated herein. The disclosures of these patents are incorporated herein in their entirety by reference.

EXAMPLES

The following experiments were conducted to demonstrate various aspects of the multilayer films of the present invention.

The test procedures utilized in the following examples are set forth in the following Table.

STRETCH FILM TEST PROCEDURES

| TEST PROCEDURE | ASTM TEST METHOD |
|---|---|
| Tensile Yield Machine Direction (MD) and Transverse Direction (TD) | D882 |
| Tensile Ultimate MD & TD | D882 |
| Tensile Elongation MD & TD | D882 |
| Tensile MD & TD Force @ | |
| 200% Stretch | D882 |
| 250% Stretch | D882 |
| 300% Stretch | D882 |
| 350% Stretch | D882 |
| Elmendorf Tear MD | D1922 |
| Elmendorf Tear TD | D1922 |
| Total Energy Dart Drop | D4272 |

-continued

STRETCH FILM TEST PROCEDURES

| TEST PROCEDURE | ASTM TEST METHOD |
|---|---|
| F-50 Dart Drop | D1709 |
| Gardner Gloss | D2457 |
| Gardner Haze | D1003 |
| Instron Peel Cling | D5458 |
| Coefficient of Friction (static) 0/0 | D1894 |
| Coefficient of Friction (kinetic) 0/0 | D1894 |
| Instron Probe Puncture Energy | — |

The probe energy test was conducted by use of an Instron Universal tester that records a continuous reading of the force (stress) and penetration (strain) curve. A 6 in. by 6 in. film specimen is securely mounted to a compression load cell to expose a 4 in. by 4 in. area. A hemispherically shaped (1 in. dia.) stainless steel probe, traveling at a constant speed of 10 in./min is lowered into the film. A stress/strain curve is recorded and plotted. Peak force is the maximum force encountered. The machine is used to integrate the area under the curve, which is indicative of the energy consumed during the penetration to rupture testing of the film.

The films were prepared using a commercially available cast film line machine. The material melt temperatures ranged from 380–580° F. and were chosen to match melt viscosities of the various resins. The melts were conveyed to a coextrusion adapter that combines the melt flows into a multilayer coextruded structure. This layered flow was distributed through a single manifold film extrusion die to the required width. The die gap opening was nominally 0.025 inches. The material was drawn down to the final gauge. The material draw down ratio was about 31:1 for the 0.8 mil films. A vacuum box was used to pin the melt exiting the die opening to a primary chill roll maintained at about 90° F.

Example 1

The following example describes the properties of films prepared using a blend of a metallocene-catalyzed polyethylene (PE) resin with a linear low density polyethylene (LLDPE) resin. These blends can be used to construct the puncture resistant film layer of the multilayer films of the present invention.

Various films were prepared from a resin blend containing a LLDPE resin, Resin A, and a metallocene-catalyzed PE resin, Resin B. The LLDPE resin, Resin A, was a resin having a density of 0.918 g/cm$^3$, a 3.3 MI, a $M_n$ of 22,000 and a $M_w$ of 77,000. The metallocene-catalyzed PE resin, Resin B, was a hexene co-polymer polyethylene having a 3.3 MI, 0.918 g/cm$^3$ density, a $M_n$ of 26,000 and a $M_w$ of 73,000. The resins were blended together and melted to form a homogeneous blend, and then extruded into a cast film having a thickness of about 0.8 mils. The film was then tested for various properties as set forth in Table 1.1.

The films were also tested for performance in a stretch wrapper constructed with equipment to determine various film properties during the stretching operation. The testing was conducted at rates similar to those employed by commercial equipment. The film width was 20 inches for this test machine. The machine direction (MD) force at 200% elongation, and maximum stretch and force values at breakage, were determined. The results are shown in Table 1.1.

TABLE 1.1

| TEST # | 6 | 5 | 4 | 3 | 2 | 1 |
|---|---|---|---|---|---|---|
| SAMPLE DESCRIPTION | | | | | | |
| Film Gauge (mils) | 0.80 | 0.80 | 0.80 | 0.80 | 0.80 | 0.80 |
| Configuration | Single Layer B Resin | Single Layer AB Blends | Single Layer AB Blends | Single Layer AB Blends | Single Layer AB Blends | Single Layer A Resin |
| Resin A, wt. % | 0.0 | 20.0 | 40.0 | 60.0 | 80.0 | 100 |
| Resin B, wt. % | 100.0 | 80.0 | 60.0 | 40.0 | 20.0 | 0.0 |
| LAB ANALYSIS | | | | | | |
| Tensile Ultimate MD (psi) | 4663.0 | 5915.0 | 6216.0 | 5617.0 | 4801.0 | 4977.0 |
| Tensile Elongation MD (%) | 520.0 | 585.0 | 656.0 | 638.0 | 603.0 | 603.0 |
| MD Force 200% Stretch (psi) | 1615.0 | 1671.0 | 1465.0 | 1462.0 | 1463.0 | 1500.0 |
| MD Force 250% Stretch (psi) | 1734.0 | 1836.0 | 1527.0 | 1493.0 | 1519.0 | 1549.0 |
| MD Force 300% Stretch (psi) | 1969.0 | 2131.0 | 1692.0 | 1639.0 | 1573.0 | 1607.0 |
| MD Force 350% Stretch (psi) | 2334.0 | 2510.0 | 1935.0 | 1896.0 | 1852.0 | 1890.0 |
| Elmendorf Tear MD (g/mil) | 311.0 | 330.0 | 317.0 | 281.0 | 256.0 | 221.0 |
| Elmendorf Tear TD (g/mil) | 473.0 | 548.0 | 578.0 | 635.0 | 652.0 | 638.0 |
| Instron Probe Puncture Energy (in - lbs./mil) | 19.5 | 18.2 | 18.3 | 22.9 | 21.9 | 25.1 |
| Total Energy Dart Drop (in - lbs/mil) | 58.9 | 57.4 | 29.5 | 22.5 | 15.6 | 19.0 |
| F-50 Dart Drop (gms/mil) | 515+[1] | 353.0 | 373.0 | 146.0 | 138.6 | 123.5 |
| Cling (grams/in) | 72.8 | 118.9 | 152.2 | 191.5 | 207.6 | 220.5 |
| Gloss (%) | 84.3 | 91.8 | 92.6 | 92.4 | 91.7 | 91.8 |
| Haze (%) | 2.64 | 1.58 | 1.48 | 17.20 | 1.94 | 1.88 |
| STRETCH WRAP TESTER | | | | | | |
| Force 200% Stretch (lb./in) | 1.44 | 2.11 | 2.11 | 2.17 | 2.17 | 2.12 |
| Force Break (lb./in) | 1.62 | 2.44 | 2.46 | 2.44 | 2.44 | 2.48 |
| Maximum Stretch to Break (%) | 334.0 | 375.0 | 385.0 | 380.0 | 382.0 | 401.0 |

[1]exceeded limit of test equipment

The data in Table 1.1 show the benefit of using the metallocene-catalyzed PE resin to increase the puncture resistance of a film layer at high puncturing conditions. For instance, the films having a majority of the metallocene-catalyzed PE resin had superior F-50 dart drop values.

It has been observed that the transverse directional tear of the films prepared with at least about 20 or 40 weight percent of the metallocene-catalyzed PE resin is catastrophic. That is, in the stretched condition, these films tear in the transverse direction in a clean, straight, and thoroughly instantaneous manner when a film defect is encountered such as a small hole, tear or puncture. This is in contrast to the tear exhibited by films that do not contain the metallocene-catalyzed PE resin, such as Film 1 in this example, which exhibits a highly distorted and rippled film tear indicating the absorption of energy during the tearing process. The catastrophic tear characteristic of the films containing the metallocene-catalyzed PE resin is an undesirable characteristic for a stretch wrap film. Such catastrophic tearing events will generally result in having to shut down the automated stretch wrapping equipment with a significant economic loss.

Example 2

Experiments were conducted to analyze the properties of a film containing a layer of a metallocene-catalyzed polyethylene (PE) resin between slip and cling outer film layers. Films were constructed having a three layer construction, ABC, where the films were constructed with an outer slip layer, layer A, constructed from the resins set forth in Table 2.1. The LLDPE1 resin was a polyethylene hexene copolymer resin having a MI of 4 and a density of 0.941 g/cm$^3$, the LLDPE2 resin was a polyethylene hexene copolymer resin having a MI of 2 and a density of 0.941 g/cm$^3$, and the PP resin was a polypropylene hexene copolymer resin having a melt flow rate of 4 and a density of 0.90 g/cm$^3$. The outer cling layer, layer C, was constructed from a polyethylene methyl acrylate (EMA; 28% methyl acrylate) copolymer resin having a MI of 5 and a density of 0.908 g/cm$^3$. The inner core layer, layer B, was constructed from a metallocene-catalyzed LLDPE resin with a MI of 2.5 and a density of 0.918 g/cm$^3$. The resins were coextruded with the resin weight percent as shown in Table 2.1. The films were then tested for various properties as set forth in Table 2.1. The films were also tested for performance in a stretch wrap tester as described in Example 1. The film width was 20 inches. The machine direction (MD) force at 200% elongation, and maximum stretch and force values at breakage, were determined. The results are shown in Table 2.1.

TABLE 2.1

| TEST # | 7 | 8 | 9 |
|---|---|---|---|
| SAMPLE DESCRIPTION | | | |
| Gauge (Mils) | 2.5 | 2.5 | 2.5 |
| Layer Structure | ABC | ABC | ABC |
| Layer Structure % (A-B-C) | 15-75-10 | 15-75-10 | 15-75-10 |
| Layer "A" Resin | LLPDE1 | LLPDE2 | PP |
| Layer "B" Resin | mLLDPE | mLLDPE | mLLDPE |
| Layer "C" Resin | EMA | EMA | EMA |
| LAB ANALYSIS | | | |
| MD Force @ 50% (psi) | 1357 | 1358 | 1410 |
| MD Force @ 200% (psi) | 1390 | 1402 | 1510 |
| TD Force @ 50% (psi) | 1277 | 1271 | 1266 |
| TD Force @ 200% (psi) | 1325 | 1330 | 1399 |
| MD Ultimate (psi) | 5592 | 5962 | 6142 |
| TD Ultimate (psi) | 5061 | 5371 | 5401 |

TABLE 2.1-continued

| TEST # | 7 | 8 | 9 |
|---|---|---|---|
| MD Elongation (%) | 833 | 845 | 818 |
| TD Elongation (%) | 870 | 883 | 855 |
| MD Tear (g/mil) | 303.9 | 281.9 | 352.6 |
| TD Tear (g/mil) | 378.1 | 354.1 | 433.6 |
| TEDD (in-lbs./mil) | 10.3 | 11.1 | No Failure |
| Probe - ¾" (in-lbs.(mil) | 25.1 | 24.4 | 24.4 |
| F-50 Dart-Drop (grams) | 344.3 | 302.0 | 510.4 |
| Unstretched Cling I/O (grams/in.) | 462.8 | 477.6 | 367.3 |
| Coefficient of Friction (Static) O/O | Above 1.0 | Above 1.0 | 0.67 |
| Coefficient of Friction (Kinstic) O/O | 6.5 | 5.7 | 8.9 |
| Unstretched Haze (%) | 77.4 | 78.8 | 62.0 |
| Unstretched Gloss (%) | | | |
| STRETCH WRAP TESTER | | | |
| MD Force @ 200% (lbs./in) | 6.75 | 6.69 | 6.4 |
| Maximum Stretch Percentage | 335 | 321 | 337 |
| Maximum Force (lbs./in) | 7.09 | 6.96 | 6.81 |
| Unwind Noise (peak db @ 1 ft.) | 87 | 88 | 92 |

Example 3

Experiments were conducted to analyze the properties of films utilizing a layer of a strain hardening resin possessing superior transverse direction tear properties along with a layer of a metallocene-catalyzed PE resin. This film construction can be used as the interior core of a multilayer film of the present invention, with the inclusion of an outer slip and an outer cling layer to complete the inventive film construction. Three films were prepared having a BCB film construction where the outer B layers were constructed with the metallocene-catalyzed PE resin used in Example 1, and the C core layer was a 2.0 MI LDPE resin, having a density of 0.921 g/cm$^3$. The two resins were coextruded with the overall B resin content set forth in Table 3.1, that content being essentially evenly split between both outside film layers. The films were then tested for various properties as set forth in Table 3.1.

The films were also tested for performance in a stretch wrap tester as in Example 1. The film width was 20 inches. The machine direction (MD) force at 200% elongation, and maximum stretch and force values at breakage, were determined. The results are shown in Table 3.1.

Film 6 from Example 1 is shown in the table for comparison purposes.

TABLE 3.1

| TEST # | 6 | 10 | 11 | 12 |
|---|---|---|---|---|
| SAMPLE DESCRIPTION | | | | |
| Film Gauge (mils) | 0.80 | 0.80 | 0.80 | 0.80 |
| Configuration | Single Layer Mettallocene Resin | B/C/B | B/C/B | B/C/B |
| Resin B, wt. % | 100.0 | 90.0 | 80.0 | 70.0 |
| Resin C, wt. % | 0 | 10.0 | 20.0 | 30.0 |
| LAB ANALYSIS | | | | |
| Tensile Ultimate MD (psi) | 4663.0 | 5899.0 | 6663.0 | 5464.0 |
| Tensile Elongation MD (%) | 520.0 | 611.0 | 652.0 | 591.0 |
| MD Force 200% Stretch (psi) | 1615.0 | 1845.0 | 2134.0 | 2402.0 |
| MD Force 250% Stretch (psi) | 1734.0 | 1950.0 | 2272.0 | 2562.0 |
| MD Force 300% Stretch (psi) | 1969.0 | 2168.0 | 2493.0 | 2788.0 |
| MD Force 350% Stretch (psi) | 2334.0 | 2451.0 | 2758.0 | 3078.0 |
| Elmendorf Tear MD (g/mil) | 311.0 | 317.0 | 346.0 | 261.0 |
| Elmendorf Tear TD (g/mil) | 473.0 | 515.0 | 594.0 | 805.0 |
| Instron Probe Puncture | 19.5 | 18.3 | 16.5 | 17.7 |

TABLE 3.1-continued

| TEST # | 6 | 10 | 11 | 12 |
|---|---|---|---|---|
| Energy (in - lbs./mil) | | | | |
| Total Energy Dart Drop (in - lbs/mil) | 58.9 | 58.3 | 46.7 | 24.8 |
| F-50 Dart Drop (g/mil) | 515+ | 451.0 | 440.0 | 206.0 |
| Cling (grams/in.) | 72.8 | 77.6 | 80.3 | 75.7 |
| Gloss (%) | 84.3 | 85.2 | 84.2 | 85.6 |
| Haze (%) | 2.64 | 2.58 | 2.56 | 2.28 |
| STRETCH WRAP TESTER | | | | |
| Force 200% Stretch (lb./in.) | 1.44 | 2.51 | 2.81 | 3.16 |
| Force Break (lb./in.) | 1.62 | 2.74 | 3.21 | 3.29 |
| Maximum Stretch to Break (%) | 334.0 | 352.0 | 435.0 | 345.0 |

The incorporation of an internal film core utilizing both the LDPE resin and the metallocene-catalyzed PE resin as separate layers shows that such a core construction provides superior elongation (tensile elongation MD and maximum stretch to break tests) and machine and transverse direction tear properties.

It was further found that the transverse tera characteristics of the inventive films was not of a catastrophic nature, but was more of a feathered nature, in distinction to those films containing the metallocene-catalyzed PE resin in Example 1. The preparation of films that do not exhibit catastrophic transverse direction tear failure is an important aspect to the construction of a stretch wrap film as the film will not be subject to catastrophic tear failure in use if a puncture should occur.

Example 4

Four and five layer films are prepared having the construction ABCD, ABCBD, and ACBCD. The outer slip layer, layer A, is made from any of the layer A resins of Example 2. The inner core puncture resistant layer, layer B, is made from the metallocene-catalyzed PE resin of Example 1. The inner core transverse direction tear resistant film layer, layer C, is made from the a HPLDPE resin having a density of 0.921 g/cm$^3$, a MI of 2. The outer cling layer, layer D, is the EMA resin of Example 2. The weight percent of the film layers for the ABCD construction is 10% layer A, 60% layer B, 20% layer C, and 10% layer D; for the ABCBD construction is 10% layer A, 70% layer B (split evenly between the two B layers), 10% layer C, and 10% layer D; for the ACBCD construction is 10% layer A, 60% layer B, 20% layer C (split evenly between the two C layers), and 10% layer D.

The films are tested according to the test procedures set forth in Example 2.

These examples show that the inventive multilayer films provide an overall film possessing superior puncture, elongation, and transverse tear resistance properties, while maintaining high levels of machine direction tear resistance.

What is claimed is:

1. A multilayer, stretch wrap film that contains at least four polymeric layers, comprising:

(a) a first outer polymeric layer, said first outer polymeric layer being a cling layer;

(b) a second outer polymeric layer, said second outer polymeric layer being a slip layer, said first outer film layer having sufficient cling resulting from inherent cling alone, cling additives or a combination thereof so as to produce a cling force to the second layer of at least about 140 grams/inch as determined by ASTM D5458-

94, and said second outer layer having a kinetic coefficient of friction value of below about 1.0 to a layer of itself;

(c) a puncture resistant, inner polymeric layer, located between said first outer layer and said second outer layer, said puncture resistant layer comprising at least 40 weight percent of a polyethylene copolymer or terpolymer resin, said polyethylene copolymer or terpolymer resin having a polydispersity of from 1 to 4, a melt index of from 0.5 to 10 g/10 min., and a melt flow ratio ($I_{20}/I_2$) of from 12 to 22; and (d) a tear resistant, inner polymeric layer, located adjacent to said puncture resistant inner layer, said tear resistant layer constructed with a resin that produces a film having a higher transverse direction tear resistance than a film produced by the resins used to construct said puncture resistant film layer, said first outer layer and second outer layer;

so as to produce a stretch wrap film having a transverse direction tear resistance of at least 500 g/mil as determined by ASTM D1922, a machine direction tear resistance of at least about 175 g/mil as determined by ASTM D1922, and an F-50 dart drop value of at least about 150 g/mil, as determined by ASTM D1709.

2. The stretch wrap film of claim 1 wherein said first outer layer has sufficient cling resulting from inherent cling alone, cling additives or a combination thereof so as to produce a cling force to the second outer layer at least about 180 grams/inch.

3. The stretch wrap film of claim 1 wherein said polyethylene resin of said puncture resistant layer has a density of from about 0.88 to about 0.94 g/cm$^3$.

4. The stretch wrap film of claim 1 wherein said puncture resistant layer comprises at least about 50 weight percent of said polyethylene resin.

5. The stretch wrap film of claim 4 wherein said polyethylene resin of said puncture resistant layer has a polydispersity of between about 2.0 and 4.0.

6. The stretch wrap film of claim 4 wherein the F-50 dart drop value of said stretch wrap film is at least about 250 g/mil.

7. The stretch wrap film of claim 4 wherein the transverse direction tear resistance of the stretch wrap film is at least about 600 g/mil.

8. The stretch wrap film of claim 7 wherein the stretch wrap film has a transverse direction tear resistance of at least 700 g/mil.

9. The stretch wrap film of claim 7 wherein the machine direction tear resistance of the stretch wrap film is at least about 225 g/mil.

10. The stretch wrap film of claim 9 wherein the machine direction tear resistance of the stretch wrap film is at least about 275 g/mil.

11. The stretch wrap film of claim 4 wherein the stretch wrap film has a force required to elongate the film 200% of at least 1600 psi as determined by ASTM D882, and a force required to elongate the film 250% of at least 1800 psi as determined by ASTM D882.

12. The stretch wrap film of claim 11 wherein the stretch wrap film has a force required to elongate the film 200% of at least 2000 psi and a force required to elongate the film 250% of at least 2250 psi.

13. The stretch wrap film of claim 4 wherein said polyethylene resin of said puncture resistant film layer has a polydispersity of 2.0 to 4.0, an $I_{20}/I_2$ ratio of from 14 to 20, a density of from 0.88 to about 0.94 g/cm$^3$, and a melt index of from 1 to 5 g/10 min.

14. The stretch wrap film of claim 4 wherein said stretch wrap comprises from about 5 to about 20 weight percent of said first outer layer, from about 5 to about 20 weight percent of said second outer layer, from about 5 to about 40 weight percent of said tear resistant layer, and from about 40 to about 80 weight percent of said puncture resistant layer.

15. The stretch wrap film of claim 4 wherein the resin used to construct the tear resistant layer comprises a low density polyethylene resin, said low density polyethylene having a density in the range of from about 0.90 to about 0.935 g/cm$^3$ with a melt index of from about 0.5 to about 10 g/10 min.

16. The stretch wrap film of claim 1 wherein the second outer layer comprises an ethylene-acrylate polymer, said ethylene-acrylate polymer having an acrylate content between about 2 to about 40 weight percent.

17. The stretch wrap film of claim 1 further comprising at least one additional puncture resistant, inner polymeric layer, located between said first outer layer and said second outer layer, said additional puncture resistant layer comprising at least 40 weight percent of a polyethylene resin, said polyethylene resin having a polydispersity of from 1 to 4, a melt index of from 0.5 to 10 g/10 min., and a $I_{20}/I_2$ melt flow ratio of from 14 to 20.

18. The stretch wrap film of claim 17 wherein said polyethylene resin of said additional puncture resistant film layer has a density of from about 0.88 to about 0.94 g/cm$^3$.

19. The stretch wrap film of claim 17 wherein said additional puncture resistant film layer comprises at least about 50 weight percent of said polyethylene resin.

20. The stretch wrap film of claim 4 further comprising at least one additional tear resistant, inner polymeric layer, located between said first outer layer and second outer layer, said additional tear resistant layer constructed with a resin that produces a film having a higher transverse direction tear resistance than a film produced by the resins used to construct said puncture resistant layer and said first outer layer and second outer layer.

21. The stretch wrap film of claim 1 wherein said polyethylene resin of said puncture resistant layer is made with a metallocene catalyst.

22. The stretch wrap film of claim 1 wherein said cling force is partially from at least one cling additive.

23. The stretch wrap film of claim 22 wherein said cling additive is poly-isobutylene.

24. The stretch wrap film of claim 1 wherein said cling force is partially from n-hexane extractable.

25. A multilayer, stretch wrap film that contains at least four polymeric layers, comprising:

(a) a first outer polymeric layer, said first outer polymeric layer being a cling layer comprising an ethylene-acrylate resin, said ethylene-acrylate resin having an acrylate content of between about 2 and 40 percent by weight and a melt index of from about 3 to about 7 g/10 min.;

(b) a second outer polymeric layer, said second outer polymeric layer being a slip layer, said first outer layer having sufficient cling resulting from inherent cling alone, cling additives or a combination thereof so as to produce a cling force to the second layer of at least about 140 grams/inch as determined by ASTM D5458-94, and said second outer layer having a kinetic coefficient of friction value of below about 1.0 to a layer of itself;

(c) a puncture resistant, inner polymeric layer, located between said first outer layer and said second outer layer said puncture resistant layer comprising at least 40 weight percent of a polyethylene copolymer or terpolymer resin, said polyethylene copolymer or terpolymer resin having a polydispersity of from 1 to 4, a melt index of from 0.5 to 10 g/10 min., and a melt flow ratio ($I_{20}/I_2$) of from 12 to 22; and (d) a tear resistant, inner polymeric layer, located adjacent to said puncture resistant inner layer, said tear resistant layer comprising a high pressure low density polyethylene resin, said high pressure low density polyethylene resin having a density of from about 0.90 to about 0.935 g/cm$^3$ and a melt index of from about 0.5 to about 10 g/10 min.;

so as to produce a stretch wrap film having a transverse direction tear resistance of at least 500 g/mil as determined by ASTM D1922, a machine direction tear resistance of at least about 175 g/mil as determined by ASTM D1922, and an F-50 dart drop value of at least 150 g/mil as determined by ASTM D1709.

26. The stretch wrap film of claim 25 wherein said first outer layer has sufficient cling resulting from inherent cling alone, cling additives or a combination thereof so as to produce a cling force to the second outer layer at least about 180 grams/inch.

27. The stretch wrap film of claim 25 wherein said polyethylene resin of said puncture resistant layer has a density of from about 0.88 to about 0.94 g/cm$^3$.

28. The stretch wrap film of claim 27 wherein said puncture resistant layer comprises at least about 50 weight percent of said polyethylene resin.

29. The stretch wrap film of claim 28 wherein the F-50 dart drop value of said stretch wrap film is at least about 250 g/mil.

30. The stretch wrap film of claim 28 wherein the transverse direction tear resistance of the stretch wrap film is at least about 600 g/mil.

31. The stretch wrap film of claim 30 wherein the stretch wrap film has a transverse direction tear resistance of at least 700 g/mil.

32. The stretch wrap film of claim 30 wherein the stretch wrap film has a machine direction tear resistance of at least about 225 g/mil.

33. The stretch wrap film of claim 32 wherein the stretch wrap film has a machine direction tear resistance of at least about 275 g/mil.

34. The stretch wrap film of claim 28 the stretch wrap film has a force required to elongate the film 200% of at least 1600 psi as determined by ASTM D822 and a force required to elongate the film 250% of at least 1800 psi as determined by ASTM D822.

35. The stretch wrap film of claim 34 the stretch wrap film has a force required to elongate the film 200% of at least 2000 psi and a force required to elongate the film 250% of at least 2250 psi.

36. The stretch wrap film of claim 28 wherein said stretch wrap comprises from about 5 to about 20 weight percent of said first outer layer, from about 5 to about 20 weight percent of said second outer layer, from about 5 to about 40 weight percent of said tear resistant layer, and from about 40 to about 80 weight percent of said puncture resistant layer film.

37. The stretch wrap film of claim 25 wherein said second outer layer comprises a linear low density polyethylene resin, said linear low density polyethylene having a density of from about 0.925 to about 0.945 g/cm$^3$ and a melt index of from about 2.0 to about 5.0 g/10 min.

38. The stretch wrap film of claim 25 wherein said polyethylene resin of said puncture resistant layer is made with a metallocene catalyst.

39. The stretch wrap film of claim 25 wherein said cling force is partially from at least one cling additive.

40. The stretch wrap film of claim 39 wherein said cling additive is poly-isobutylene.

41. The stretch wrap film of claim 25 wherein said cling force is partially from n-hexane extractables.

42. A multilayer, stretch wrap film that contains at least four polymeric film layers, comprising:

(a) a first outer polymeric layer comprising about 5 to about 20 wt. % polyethylene methyl acrylate, said polyethylene methyl acrylate having a melt index of from about 3 to about 7 g/10 min., said first outer polymeric layer being a cling layer;

(b) a second outer polymeric layer comprising an anti-block additive and about 2 to about 40 wt. % of a resin chosen from the group consisting of a linear lower density polyethylene and a polypropylene resin, said linear lower density having a melt index of from about 2 to about 5 g/10 min., said polypropylene resin having a melt flow ratio of from about 3 to about 10 and a density of from about 0.925 to about 0.945 g/cm$^3$, said second outer polymeric layer being a slip layer, said first outer layer has sufficient cling resulting from inherent cling alone, cling additives or a combination thereof so as to produce a cling force to the second layer of at least about 180 grams/inch as determined by ASTM D5458-94, and said second outer layer having a kinetic coefficient of friction value of below about 1.0 to a layer of itself;

(c) a puncture resistant, inner polymeric layer, located between said first outer layer and said second outer layer, said puncture resistant layer comprising at least 40 weight percent of a copolymer of ethylene and hexene prepared using a metallocene catalyst, said copolymer having a polydispersity of from about 2 to about 3, a melt index of from about 1 to about 5 g/10 min., and a melt flow ratio ($I_{20}/I_2$) of from about 16 to about 18; and (d) a tear resistant, inner polymeric layer, located adjacent to said puncture resistant layer, said tear resistant layer comprising about 5 to about 20 wt. % of a resin that produces a film having a higher transverse direction tear resistance than a film produced by the resins used to construct said puncture resistant layer and said first outer layer and said second outer layer said resin having a melt index of about 1 to about 2.5 g/10 min.;

so as to produce a stretch wrap film having a transverse direction tear resistance of at least 700 g/mil as determined by ASTM D1922, a machine direction tear resistance of at least about 225 g/mil as determined by ASTM D1922, an F-50 dart drop value of at least 250 g/mil as determined by ASTM D1709, a force required to elongate the film 200% of at least 2000 psi as determined by ASTM D882 and a force required to elongate the film 250% of at least 2250 psi as determined by ASTM D882.

43. A multilayer, stretch wrap film that contains at least four polymeric film layers, including a first outer polymeric layer, a second outer polymeric layer, a third polymeric layer and a fourth polymeric layer, wherein said first outer layer has sufficient cling resulting from inherent cling alone, cling additives or a combination thereof so as to produce a cling force to the second outer layer of at least about 140 grams/inch as determined by ASTM D5458-94, said second outer layer has a kinetic coefficient of friction value of below about 1.0 to a layer of itself, each of said third and fourth polymeric layers being located between said first layer and said second layer, so as to produce a stretch wrap film having a transverse direction tear resistance of at least 500 g/mil as determined by ASTM D1922, a machine direction tear resistance of at least about 175 g/mil as determined by ASTM D1922, and an F-50 dart drop value of at least about 150 g/mil as determined by ASTM D 1709.

44. The stretch wrap film of claim 43 wherein said first outer layer has sufficient cling resulting from inherent cling alone, cling additives or a combination thereof so as to produce a cling force to the second outer layer of at least about 180 grams/inch.

45. The stretch wrap film of claim 43 wherein the F-50 dart drop value of said stretch wrap film is at least about 250 g/mil.

46. The stretch wrap film of claim 43 wherein the transverse direction tear resistance of the stretch wrap film is at least about 600 g/mil.

47. The stretch wrap film of claim 43 wherein the stretch wrap film has a transverse direction tear resistance of at least about 700 g/mil.

48. The stretch wrap film of claim 43 wherein the machine direction tear resistance of the stretch wrap film is at least about 225 g/mil.

49. The stretch wrap film of claim 48 wherein the machine direction tear resistance of the stretch wrap film is at least about 225 g/mil.

50. The stretch wrap film of claim 43 wherein the stretch wrap film has a force required to elongate the film 200% of at least 1600 psi as determined by ASTM D882 and a force required to elongate the film 250% of at least 1800 psi as determined by ASTM D882.

51. The stretch wrap film of claim 50 wherein the stretch wrap film has a force required to elongate the film 200% of at least 2000 psi and a force required to elongate the film 250% of at least 2250 psi.

52. The stretch wrap film of claim 43 wherein said cling force is partially from n-hexane extractables.

53. The stretch wrap film of claim 43 wherein said cling force is partially from at least one cling additive.

54. The stretch wrap film of claim 43 wherein said cling additive is poly-isobutylene.

*55. A multilayer, stretch wrap film that contains at least four polymeric layers, comprising:*

*(a) a first outer polymeric layer, said first outer polymeric layer being a cling layer;*

*(b) a second outer polymeric layer, said second outer polymeric layer being a slip layer, said first outer film layer having sufficient cling resulting from inherent cling alone, cling additives or a combination thereof so as to produce a cling force to the second layer of at least about 140 grams/inch as determined by ASTM D5458-94, and said second outer layer having a kinetic coefficient of friction value of below about 1.0 to a layer of itself,*

*(c) a puncture resistant, inner polymeric layer, located between said first outer layer and said second outer layer, said punbcture resistant layer comprising at least 40 weight percent of a polyethylene copolymer or terpolymer resin, said polyethylene copolymer or terpolymer resin having a melt index of from 0.5 to 10 g/10 min., and a melt flow ratio ($I_{20}/I_2$) of from 12 to 22; and*

*(d) a tear resistant, inner polymeric layer, located adjacent to said puncture resistant inner layer, said tear resistant layer constructed with a resin that produces a film having a higher transverse direction tear resistance than a film produced by the resins used to construct said puncture resistant film layer, said first outer layer and second outer layer;*

*so as to produce a stretch wrap film having a transverse direction tear resistance of at least 500 g/mil as determined by ASTM D1922, a machine direction tear resistance of at least about 175 g/mil as determined by ASTM D1922 and an F-50 dart drop value of at least about 150 g/mil, as determined by ASTM D1709.*

*56. The stretch wrap film of claim 55 wherein said first outer layer has sufficient cling resulting from inherent cling alone, cling additives or a combination thereof so as to produce a cling force to the second outer layer at least about 180 grams/inch.*

*57. The stretch wrap film of claim 55 wherein said polyethylene resin of said puncture resistant layer has a density of from about 0.88 to about 0.94 g/cm3.*

*58. The stretch wrap film of claim 55 wherein said puncture resistant layer comprises at least about 50 weight percent of said polyethylene resin.*

*59. The stretch wrap film of claim 58 wherein said polyethylene resin of said puncture resistant layer has a polydispersity of between about 2.0 and 4.0.*

*60. The stretch wrap film of claim 58 wherein the F-50 dart drop value of said stretch wrap film is at least about 250 g/mil.*

*61. The stretch wrap film of claim 58 wherein the transverse direction tear resistance of the stretch wrap film is a least about 600 g/mil.*

*62. The stretch wrap film of claim 61 wherein the stretch wrap film has a transverse direction tear resistance of at least 700 g/mil.*

*63. The stretch wrap film of claim 61 wherein the stretch wrap film has a transverse direction tear resistance of at least 225 g/mil.*

*64. The stretch wrap film of claim 63 wherein the machine direction tear resistance of the stretch wrap film is at least about 275 g/mil.*

*65. The stretch wrap film of claim 58 wherein the stretch wrap film has a force required to elongate the film 200% of at least 1600 psi as determined by ASTM D882, and a force required to elongate the film 250% of at least 180 psi as determined by ASTM D882.*

*66. The stretch wrap film of claim 65 wherein the stretch wrap film has a force required to elongate the film 200% of at least 2000 psi and a force required to elongate the film 250% of at least 2250 psi.*

*67. The stretch wrap film of claim 58 wherein said polyethylene resin of said puncture resistant film layer has an $I_{20}/I_2$ ratio of from 14 to 20, a density of from 0.88 to about 0.94 g/cm$^3$ and a melt index of from 1 to 5 g/10 min.*

*68. The stretch wrap film of claim 58 wherein said stretch wrap comprises from about 5 to about 20 weight percent of said first outer layer, from about 5 to about 20 weight percent of said second outer layer, from about 5 to about 40 weight percent of said tear resistant layer and from about 40 to about 80 weight percent of said puncture resistant layer.*

*69. The stretch wrap film of claim 58 wherein the resin used to construct the tear resistant layer comprises a low density polyethylene resin, said low density polyethylene having a density in the range of from about 0.90 to about 0.935 g/cm$^3$ with a melt index of from about 0.5 to about 10 g/10 min.*

*70. The stretch wrap film of claim 55 wherein the second outer layer comprises an ethylene-acrylate polymer, said ethylene-acrylate polymer having an acrylate content between about 2 to about 40 weight percent.*

*71. The stretch wrap film of claim 55 further comprising at least one additional puncture resistant inner polymeric*

*layer located between said first outer layer and said second outer layer, said additional puncture resistant layer comprising at least 40 weight percent of a polyethylene resin, said polyethylene resin having a melt index of from 0.5 to 10 g/10 min. and a $I_{20}/I_2$ melt flow ratio of from 14 to 20.*

*72. The stretch wrap film of claim 71 wherein said polyethylene resin of said additional puncture resistant film layer has a density of from about 0.88 to about 0.94 g/cm$^3$.*

*73. The stretch wrap film of claim 71 wherein said additional puncture resistant film layer comprises at least about 50 weight percent of said polyethylene resin.*

*74. The stretch wrap film of claim 58 further comprising at least one additional tear resistant, inner polymeric layer, located between said first outer layer and second outer layer, said additional tear resistant layer constructed with a resin that produces a film having a higher transverse direction tear resistance than a film produced by the resins used to construct said puncture resistant layer and said first outer layer and second outer layer.*

*75. The stretch wrap film of claim 55 wherein said polyethylene resin of said puncture resistant layer is made with a metallocene catalyst.*

*76. The stretch wrap film of claim 55 wherein said cling force is partially from at least one cling additive.*

*77. The stretch wrap film of claim 76 wherein said cling additive is polyisobutylene.*

*78. The stretch wrap film of claim 55 wherein said cling force is partially from n-hexane extractable.*

*79. A multilayer, stretch wrap film that contains at least four polymeric layers, comprising:*

*(a) a first outer polymeric layer, said first outer polymeric layer being a cling layer comprising an ethylene-acrylate resin, said ethylene-acrylate resin having an acrylate content of between about 2 and 40 percent by weight and a melt index of from about 3 to about 7 g/10 min;*

*(b) a second outer polymeric layer, said second outer polymeric layer being a slip layer, said first outer film layer having sufficient cling resulting from inherent cling alone, cling additives or a combination thereof so as to produce a cling force to the second layer of at least about 140 grams/inch as determined by ASTM D5458-94, and said second outer layer having a kinetic coefficient of friction value of below about 1.0 to a layer of itself;*

*(c) a puncture resistant, inner polymeric layer, located between said first outer layer and said second outer layer, said puncture resistant layer comprising at least 40 weight percent of a polyethylene copolymer or terpolymer resin, said polyethylene copolymer or terpolymer resin having a melt index of from 0.5 to 10 g/10 min., and a melt flow ratio ($I_{20}/I_2$) of from 12 to 22;*

*(d) a tear resistant, inner polymeric layer located adjacent to said puncture resistant inner layer said tear resistant layer comprising a high pressure low density polyethylene resin, said high pressure low density polyethylene resin having a density of from about 0.90 to about 0.935 g/cm$^3$ and a melt index of from about 0.5 to about 10 g/10 min;*

*so as to produce a stretch wrap film having a transverse direction tear resistance of at least 500 g/mil as determined by ASTM D1922, a machine direction tear resistance of a least about 175 g/mil as determined by ASTM D1922, and an F-50 dart drop value of at least 150 g/mil as determined by ASTM D1709.*

*80. The stretch wrap film of claim 79 wherein said first outer layer has sufficient cling resulting from inherent cling alone, cling additives or a combination thereof so as to produce a cling force to the second layer of least about 180 grams/inch.*

*81. The stretch wrap film of claim 79 wherein said polyethylene resin of said puncture resistant layer has a density of from about 0.88 to about 0.94 g/cm$^3$.*

*82. The stretch wrap film of claim 81 wherein said puncture resistant layer comprises at least about 50 weight percent of said polyethylene resin.*

*83. The stretch wrap film of claim 82 wherein the F-50 dart drop value of said stretch wrap film is at least about 250 g/mil.*

*84. The stretch wrap film of claim 82 wherein the transverse direction tear resistance of the stretch wrap film is at least about 600 g/mil.*

*85. The stretch wrap film of claim 84 wherein the stretch wrap film has a transverse direction tear resistance of at least 700 g/mil.*

*86. The stretch wrap film of claim 84 wherein the stretch wrap film has a machine direction tear resistance of at least about 225 g/mil.*

*87. The stretch wrap film of claim 86 wherein the stretch wrap film has a machine direction tear resistance of at least about 275 g/mil.*

*88. The stretch wrap film of claim 82 wherein the stretch wrap film has a force required to elongate the film 200% of at least 1600 psi as determined by ASTM D822 and a force required to elongate the film 250% of at least 1800 psi as determined by ASTM D822.*

*89. The stretch wrap film of claim 88 wherein the stretch wrap film has a force required to elongate the film 200% of at least 2000 psi and a force required to elongate the film 250% of at least 2250 psi.*

*90. The stretch wrap film of claim 82 wherein said stretch wrap comprises from about 5 to about 20 weight percent of said first outer layer, from about 5 to about 20 weight percent of said second outer layer, from about 5 to about 40 weight percent of said tear resistant layer, and from about 40 to about 80 weight percent of said puncture resistant layer film.*

*91. The stretch wrap film of claim 79 wherein said second outer layer comprises a linear low density polyethylene resin, said linear low density polyethylene having a density of from about 0.925 to about 0.945 g/cm$^3$ and a melt index of from about 2.0 to about 5.0 g/10 min.*

*92. The stretch wrap film of claim 79 wherein said polyethylene resin of said puncture resistant layer is made with a metallocene catalyst.*

*93. The stretch wrap film of claim 79 wherein said cling force is partially from at least one cling additive.*

*94. The stretch wrap film of claim 93 wherein said cling additive is poly-isobutylene.*

*95. The stretch wrap film of claim 79 wherein said cling force is partially from n-hexane extractables.*

*96. A multilayer, stretch wrap film that contains at least four polymeric film layers comprising:*

*(a) a first outer polymeric layer comprising about 5 to about 20 weight percent polyethylene methyl acrylate, said polyethylene methyl acrylate having a melt index of from about 3 to about 7 g/10 min., said first outer polymeric layer being a cling layer;*

*(b) a second outer polymeric layer comprising an anti-block additive and about 2 to about 40 weight percent of a resin chosen from the group consisting of a linear lower density polyethylene and a polypropylene resin,*

*said linear lower density having a melt index of from about 2 to about 5 g/10 min., said polypropylene resin having a melt flow ratio of from about 3 to about 10 and a density of from about 0.925 to about 0.945 g/cm$^3$, said second outer polymeric layer being a slip layer, said first outer layer has sufficient cling resulting from inherent cling alone, cling additives or a combination thereof so as to product a cling force to the second layer of at least about 180 grams/inch as determined by ASTM D5458-94, and said second outer layer having a kinetic coefficient of friction value of below about 1.0 to a layer of itself;*

(*c*) *a puncture resistant, inner polymeric layer, located between said first outer layer and second outer layer, said puncture resistant layer comprising at least 40 weight percent of a copolymer of ethylene and hexene prepared using a metallocene catalyst, said copolymer having melt index of from about 1 to aboug 5 g/10 min., and a melt flow ratio ($I_{20}/I_2$) of from about 16 to about 18; and*

(*d*) *a tear resistant, inner polymeric layer located adjacent to said puncture resistant layer, said tear resistant layer comprising about 5 to about 20 weight percent of a resin that produces a film having a transverse direction tear resistance than a film produced by the resins used to construct said puncture resistant layer and said first outer layer and said second outer layer, said resin having a melt index of about 1 to about 2.5 g/10 min.;*

*so as to produce a stretch wrap film having a transverse direction tear resistance of at least 700 g/mil as determined by ASTM D1922, a machine direction tear resistance of a least about 225 g/mil as determined by ASTM D1922, an F-50 dart drop value of at least 250 g/mil as determined by ASTM D1709, a force required to elongate to the film 200% of at least 2000 psi as determined by ASTM D882 and a force required to elongate the film 250% of at least 2250 psi as determined by ASTM D882.*

* * * * *